United States Patent [19]
Douglass et al.

[11] Patent Number: 5,784,624
[45] Date of Patent: Jul. 21, 1998

US005784624A

[54] MULTIPLE ASYNCHRONOUS EVENT ARBITRATOR

[75] Inventors: James M. Douglass, Carrollton; Dallas L. Ledlow, Dallas, both of Tex.

[73] Assignee: Dallas Semiconductor Corp., Dallas, Tex.

[21] Appl. No.: 594,959

[22] Filed: Jan. 31, 1996

[51] Int. Cl.⁶ .................................................. G06F 13/14
[52] U.S. Cl. ......................... 395/732; 395/729; 395/306; 395/309; 395/294
[58] Field of Search ................................ 395/293, 294, 395/296, 728, 729, 732

[56] References Cited

U.S. PATENT DOCUMENTS

| | | | |
|---|---|---|---|
| 4,191,997 | 3/1980 | Luiz | 364/200 |
| 4,339,808 | 7/1982 | North . | |
| 4,503,495 | 3/1985 | Boudreau | 364/200 |
| 4,881,195 | 11/1989 | DeLong et al. | 364/900 |
| 4,894,565 | 1/1990 | Marquardt | 307/518 |
| 5,047,921 | 9/1991 | Kinter et al. . | |
| 5,072,363 | 12/1991 | Gallagher | 395/725 |
| 5,179,705 | 1/1993 | Kent . | |

*Primary Examiner*—Ayaz R. Sheikh
*Assistant Examiner*—Jigar Pancholi
*Attorney, Agent, or Firm*—Jenkens & Gilchrist

[57] ABSTRACT

An arbitrator for selectively permitting access to a common resource by a priority device and two non-priority devices, includes a priority request reception device for receiving a priority request to access the resource by the priority device; two second request reception devices for receiving non-priority requests to access the resource by the two non-priority devices; a prioritizer coupled to receive indications of times when the priority request reception device receives the priority request and when the two non-priority request reception devices receive the non-priority requests, with the prioritizer permitting access to the resource by the priority device and non-priority device in a predetermined order.

17 Claims, 8 Drawing Sheets

MULTIPLE ASYNCHRONOUS EVENT ARBITRATOR

FIELD OF THE INVENTION

This invention relates to an arbitration system, and more particularly, to an event arbitrator for prioritizing among multiple asynchronous events.

BACKGROUND OF THE INVENTION

In an asynchronous system where several sub-systems share access to a common resource, the accesses of the common resource by these sub-systems do not occur in a clocked relationship with respect to one another. Consequently, it can not be anticipated when a particular sub-system will access the resource or in what order the sub-systems will attempt to access the resource.

For example, the Dallas Semiconductor device DS2435, a battery identification chip with time/temperature histogram, uses a common memory to store periodically updated information regarding a generated time/temperature histogram and periodically updated information regarding an elapsed time counter. The information stored in the common memory can also be accessed by a user. Because the histogram function, the elapsed time counter function, and the user access are time independent of each other, it is necessary to make certain that these events do not access the memory at the same time or they will "collide," which could cause data corruption.

For example, if a user tries to read a value from the memory regarding the time/temperature histogram information while the device is updating the time/temperature information, the time/temperature information may become corrupted. Likewise, if the elapsed time counter is being updated or incremented by the device, and the user attempts to read the memory at the same time, the elapsed time counter information could also become corrupted.

It is also desirable to ensure that each event be performed and not ignored after the multiple events have been arbitrated.

It is further desirable to prioritize the multiple occurring events. For example, it may be desirable to give the user highest priority to the memory so that the user can have "immediate" access to the memory, and not have to wait for other events to be performed.

It is a shortcoming and deficiency of the prior art that there has not heretofore been developed an arbitrator immune to corruption, designed not to ignore events, and able to prioritize events.

SUMMARY OF THE INVENTION

The present invention overcomes the above identified problems as well as other shortcomings and deficiencies of existing technologies by providing a system and method for arbitrating and prioritizing among multiple asynchronous events.

Accordingly, it is an object of the present invention to provide a device and method to arbitrate among multiple asynchronous events.

It is a further object of the present invention to provide a device and method that prioritizes and arbitrates multiple asynchronous events.

It is yet another object of the present invention to provide a device and method that prioritizes the access to a common resource among multiple devices.

It is another object of the present invention to provide a device and method that prioritizes and arbitrates multiple asynchronous events and ensures that each event is performed in a predetermined order.

In accordance with the above and other objects there is provided a device for selectively permitting access to a common resource by a priority device and at least one non-priority device that includes one input for receiving a request to access the common resource by a priority device; a second input for receiving a request to access the common resource by a non-priority device; and a prioritizer coupled to receive indications of time when the inputs receive requests to access the common resource with the prioritizer prioritizing access to the common resource between the priority device and the non-priority device corresponding to the requests received at the inputs.

BRIEF DESCRIPTION OF THE DRAWINGS

A more complete understanding of the present invention may be had by reference to the following Detailed Description when taken in conjunction with the accompanying Drawings wherein.

DETAILED DESCRIPTION OF THE PRESENTLY PREFERRED EXEMPLARY EMBODIMENTS

Figure 1:
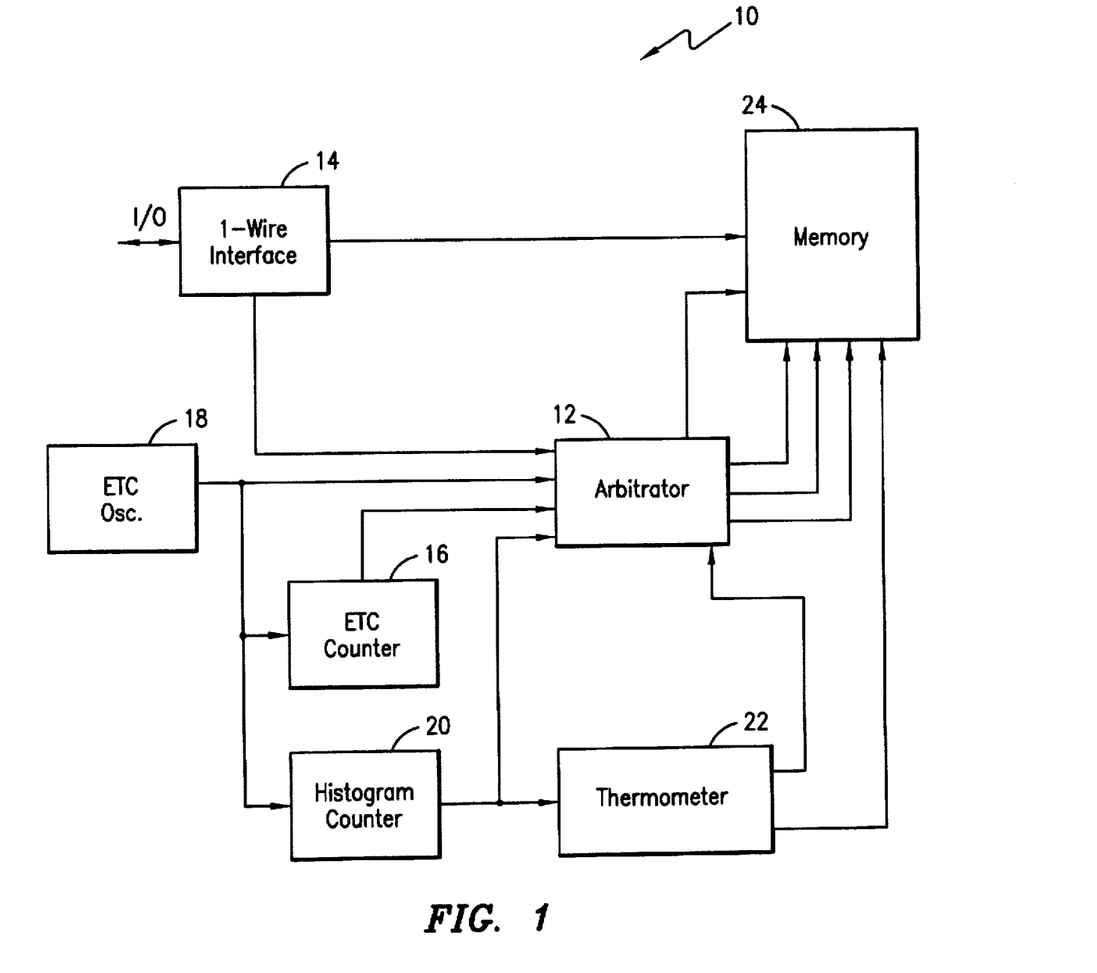
FIG. 1 is a block diagram illustrating a system utilizing a preferred embodiment of the present invention.

Referring now to the drawings wherein like or similar elements are designated with identical reference numerals throughout the several views, and wherein the various elements depicted are not necessarily drawn to scale, and in particular, to FIG. 1, there is shown a block circuit diagram 10 with a preferred embodiment of the multiple asynchronous event arbitrator 12 combined with the Dallas Semiconductor DS2435, a battery identification chip with time/temperature histogram. The DS2435 includes a one-wire wire interface 14, an elapsed time counter 16, an elapsed time counter oscillator 18, a histogram counter 20, a thermometer 22 and a memory 24.

The DS2435 generally performs three different functions with which arbitrator 12 must deal. The first is a communication from an external source through the one-wire interface 14. One-wire interface 14 permits an external device or a user to access memory 24 within circuit 10.

The second is a histogram function. The histogram function generates an accumulation of counts of different temperatures in up to eight different bins. The histogram function occurs every so often under a set period which can range from about 30 seconds to about an hour. During the histogram function, when it is time to do a histogram update, a thermometer temperature conversion is initiated, and once completed, the result of the temperature conversion is compared to registers in memory 24 that define different bins, and if the temperature falls within a range of one of the bins, that bin's count is updated or incremented.

The third is an elapsed time counter function. The elapsed time counter function is basically a time counter, where after a period of time a register in memory 24 gets incremented. The value stored in the register indicates an amount of time that has passed since the elapsed time counter 16 was initialized.

The elapsed time counter oscillator 18 and elapsed time counter 16 are used in the elapsed time counter functions of the device and histogram counter 20 and thermometer 22 are used in the histogram functions of the device.

In this particular embodiment, memory 24 consists of some scratch pad memory, nonvolatile RAM, and RAM.

Figure 2:
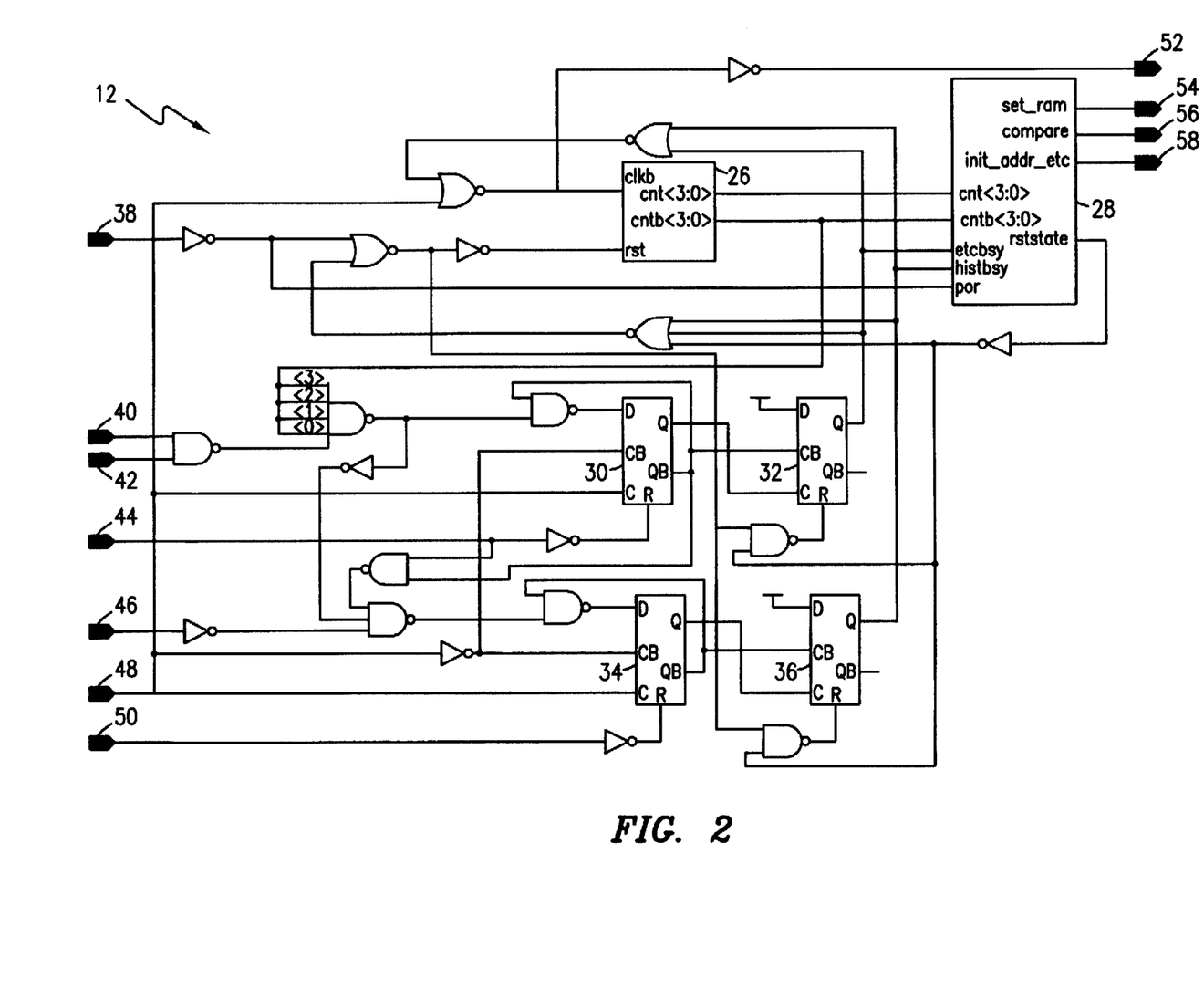
FIG. 2 is a schematic diagram illustrating a preferred embodiment of the present invention.

Referring now to FIG. 2, there is shown a schematic circuit diagram of arbitrator 12. Arbitrator 12 includes a counter 26, a state machine 28, latches 30, 32, 34 and 36, inputs 38, 40, 42, 44, 46, 48 and 50, and outputs 52, 54, 56 and 58.

Counter 26 in the present embodiment is a 4-bit gray code counter, which counts through 16 values, with only 1 bit transitioning every count. This particular counter is preferred to prevent glitches when decoding count values. However, it is contemplated to be within the scope of the invention that other types of counters and synchronizing devices could be used. Counter 26 is described in greater detail below.

Latches 30 and 32 are used in the incrementation of the elapsed time counter and latches 34 and 36 are used in the histogram sampling. Latches 30 and 32 and latches 34 and 36 are described in greater detail below.

State machine 28 is used to control the access to memory 24 through outputs 54, 56 and 58. State machine 28 is described in greater detail below.

Input 38 is primarily for receiving the power-on-reset or "porb" signal, which is active low. The "porb" signal initializes the entire circuit 12.

Input 40 is primarily for receiving the protocol start signal or "prot_start" signal which includes a request signal from a user or external device to access memory 24 and a reset signal. The signal goes high when the first protocol bit has been entered, and goes low after the reset signal has been received.

Input 42 is primarily for receiving a test signal or "test_cntb" signal. The "test_cntb" signal is used for testing arbitrator 12. The signal is active when low and high during normal operation.

Input 44 is primarily for receiving an increment signal or "inc_etc" signal and is used to increment the elapsed time counter. The "inc_etc" signal is high when the elapsed time counter function is to run.

Input 46 is primarily for receiving a thermometer busy signal or "tb" signal. When the "tb" is high it indicates that the thermometer is busy. Conversely, when the "tb" signal is low it indicates that the thermometer is not busy.

Input 48 is primarily for receiving the elapsed time counter clock signal or "etc_clk" signal. The "etc_clk" signal generally is a 50 microsecond period clock signal, which is used to drive arbitrator 12.

Input 50 is primarily for receiving the histogram sample signal or "t_samp_hist" signal. The "t_samp_hist" signal is used to indicate the taking of a histogram sample.

Outputs 52, 54, 56 and 58 of arbitrator 12 are connected to memory 24 (see FIG. 1). In particular, output 54 is primarily for outputting the select-ram signal or "sel_ram" signal which allows the appropriate portion of memory 24 to be selected for the elapsed time counter function or the histogram function. This generally is the histogram register or the elapsed time counter register.

Output 56 is primarily for outputting a "compare" signal which permits the comparison of the temperature and histogram bin boundary values. This is used to determine which temperature histogram bin to increment during a histogram function.

Output 58 is primarily for outputting an initialize or "init_addr_etc" signal which permits the initialization of the memory address to that of the first elapsed time counter value during an elapsed time counter evaluation.

In this particular embodiment, in the general operation of arbitrator 12, the priority of access to memory 24 is as follows: 1) the user; 2) the elapsed time counter function; and 3) the histogram function. In operation, if input 40 has received the first protocol bit of the "prot_start" signal, access to memory 24 will be permitted for the function of the user.

If a histogram function or an elapsed time counter function is currently accessing memory 24 when the first protocol bit of the "prot_start" signal is received at input 40, the user will still be able to access memory 24. This is because of one-wire protocols used in the present embodiment by the one-wire interface 14. In particular, one-wire protocols of at least 16 bits must be entered before any access to memory 12 can made by a user. Because each bit takes at least 60 microsecond to send, this gives the histogram function or the elapsed time counter function 960 microseconds to complete an update. Since it only takes about 750 microseconds for either the histogram or the elapsed time counter functions to complete an update, any updates occurring will be completed before the user is able to access the memory.

If the first protocol bit of the "prot_start" signal has been received at input 40, latches 30 and 32 and latches 34 and 36, respectively, will delay or hold off any request for the elapsed time counter function or the histogram function to access memory 24 until a reset signal is received at input 40.

However, if no protocol is being entered, i.e. input 40 is not receiving the "prot_start" signal, and if the count state machine 28 is 0 ("cnt<3:0>") (see FIG. 7), and if a high "inc_etc" signal is being received at input 44, the elapsed time counter function will run. Under this condition, any request for the histogram function to access memory 24 will be delayed by latches 34 and 36 until the elapsed time counter function is complete.

If input 40 is not receiving the "prot_start" signal, and if the elapsed time counter functions are not running (and not about to begin running), and if the "tb" signal being received at input 46 is low indicating that the thermometer 22 is not busy, and if the "t_samp_hist" signal being received at input 50 is high, then the histogram function will operate.

In order to prevent any histogram functions or elapsed time counter functions from being missed, the user is limited to approximately 15 seconds between one-wire resets. This however is a very minimal restriction, since the longest typical one-wire communication lasts only a few milliseconds.

Figure 3:
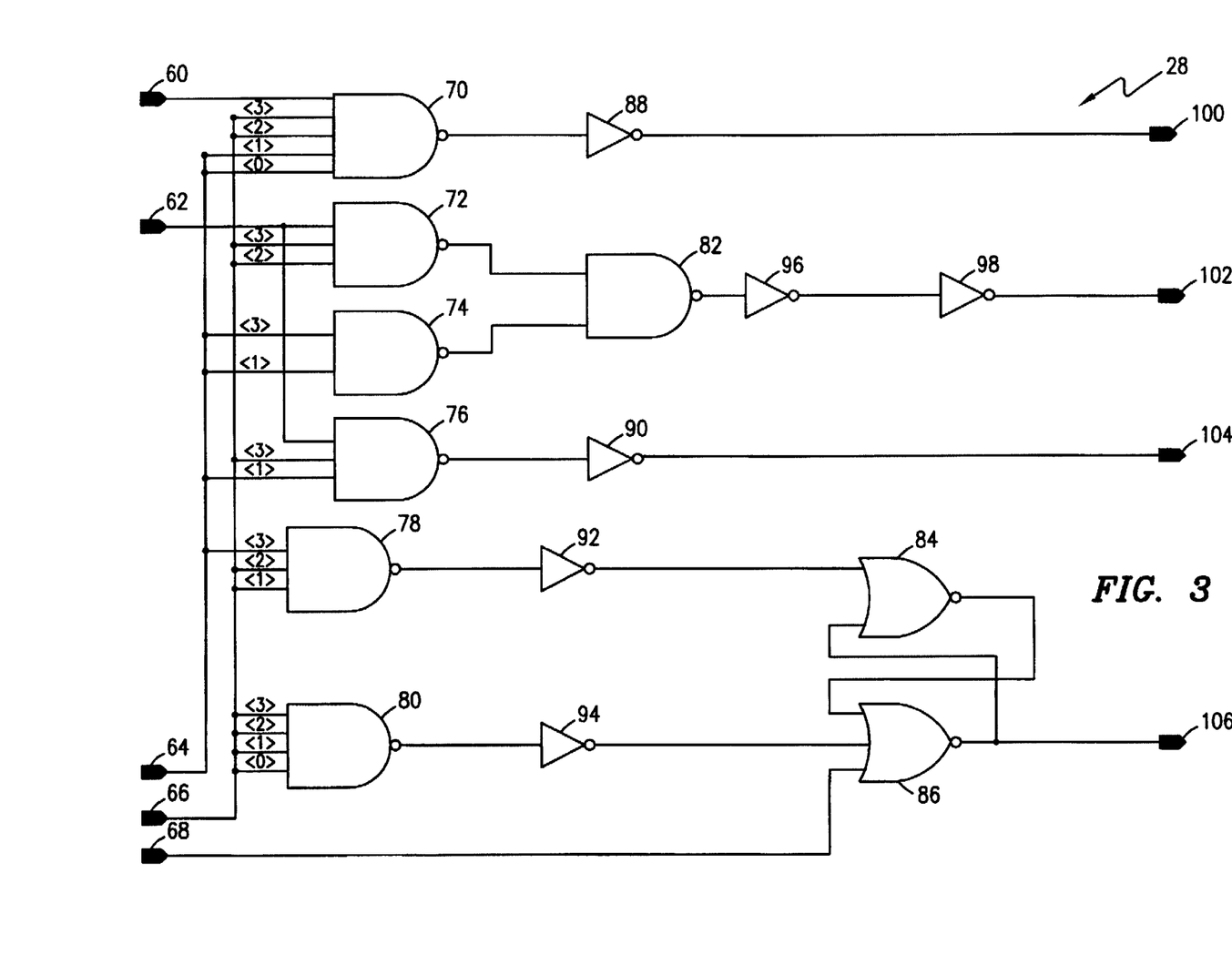
FIG. 3 is a schematic diagram illustrating a state machine utilized in a preferred embodiment of the present invention as similarly shown in FIG. 2.

Referring now to FIG. 3, there is shown schematic circuit diagram of state machine 28 as similarly shown in FIG. 2.

State machine 28 includes inputs 60, 62, 64, 66 and 68, NAND gates 70, 72, 74, 76, 78, 80, and 82, NOR gates 84 and 86, inverters 88, 90, 92, 94, 96, and 98, and outputs 100, 102, 104, and 106.

Input 60 is primarily for receiving a histogram busy signal or "histbsy" signal from latch 36. The "histbsy" signal is high when the histogram function is underway.

Input 62 is primarily for receiving an elapsed time counter busy signal or "etcbsy" signal from latch 32. The "etcbsy" signal is high when the elapsed time counter function is underway.

Inputs 64 and 66 are primarily for receiving clock pulses or counts from counter 26, and input 68 is primarily for receiving a power-on-reset signal or "por" signal.

Outputs 100, 102 and 104 are connected to outputs 54, 56 and 58 of arbitrator 12 (see FIG. 2) and output 106 is connected to a feedback loop in arbitrator 12. Output 106 sends out a signal to indicate to the rest of arbitrator 12 that a process is complete.

Figure 4:
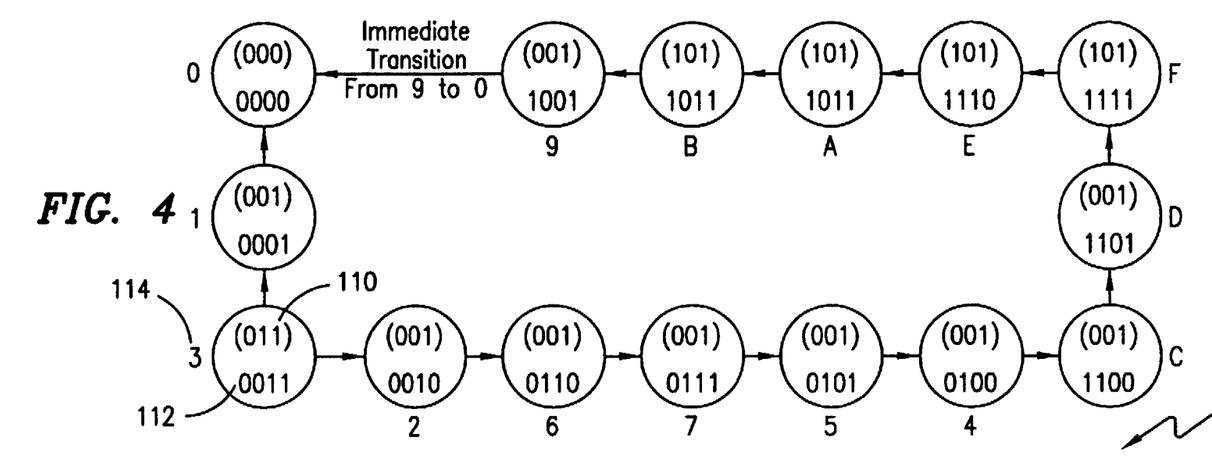
FIGS. 4&5 are state diagrams illustrating the different states of the state machine as similarly shown in FIG. 3.
Figure 5:
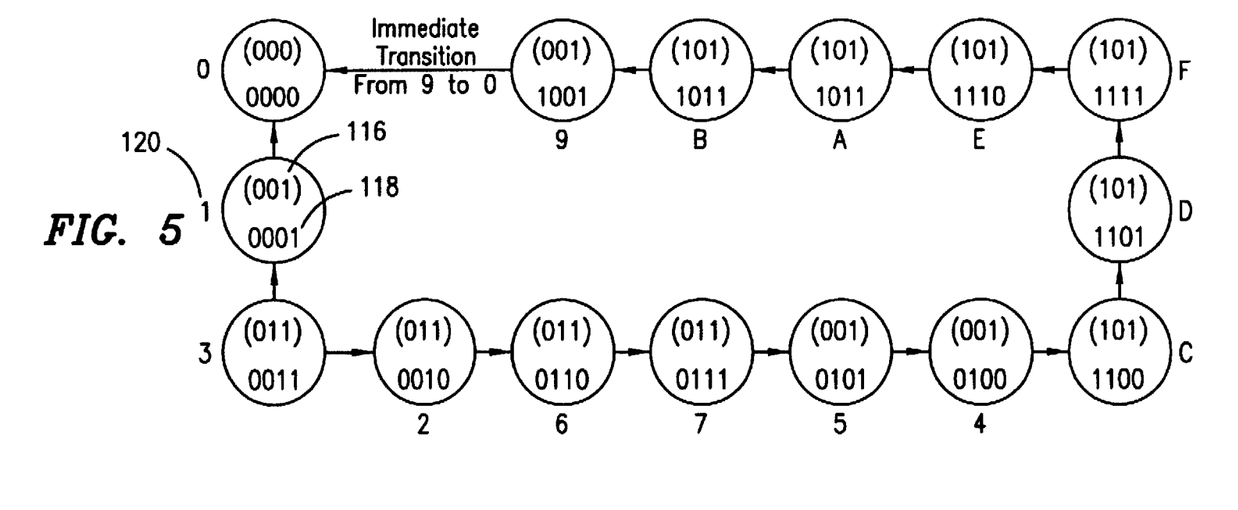

Referring now to FIGS. 4 and 5, there are illustrated state diagrams 106 and 108, respectively, for state machine 28. FIG. 4 represents the state diagram 106 for the histogram function and FIG. 5 represents the state diagram 108 for the elapsed time counter function. FIGS. 4 and 5 illustrate that the state machine 28 has 16 states for both the histogram function and the elapsed time counter function, but each only goes through 15 states with one state being skipped. Each state of the 15 states illustrated in FIGS. 4 and 5 takes about 50 microseconds to go through, thereby taking approximately 700 microseconds to complete an entire state cycle.

Referring now to FIG. 4, each of the numbers in parentheses, such as item 110, represents a different signal, and, in particular, the "sel_ram", "compare" and "histbsy" signals respectively, with 0 being a low signal and 1 being high. These are the actual signals that are occurring at the corresponding state. The bottom four numbers, such as item 112, is a binary number that represents the state of state machine 28. This number corresponds to the hexadecimal number outside the circle, such as item 114.

Referring now to FIG. 5, each of the numbers in parentheses, such as item 116, represents a different signal, and, in particular, the "sel_ram", "init_addr_etc" and "etcbsy" signals respectively, with 0 being a low signal and 1 being high. These are the actual signals that are occurring at the corresponding state. The bottom four numbers, such as item 118, is a binary number, that represents the state of state machine 28. This number corresponds to the hexadecimal number outside the circle, such as item 120.

Still referring to FIG. 5, in operation, for example, if an elapsed time counter update is occurring, in state 3 the "init_addr_etc" and "etcbsy" signals are high, and the "sel_ram" signal is low. The "init_addr_etc" and the "etcbsy" signals stay high for several states, with "init_addr_etc" signal going low in state 5, and stays low for the rest of the time. The "sel_ram" goes high at the beginning in state C and stays high through state B and goes low again in state 9.

It is contemplated to be within the scope of this invention that other configurations of state machines and other types of processors could be used, so long that once a process is completed the device can signal the rest of the circuit when it is complete.

Figure 6:
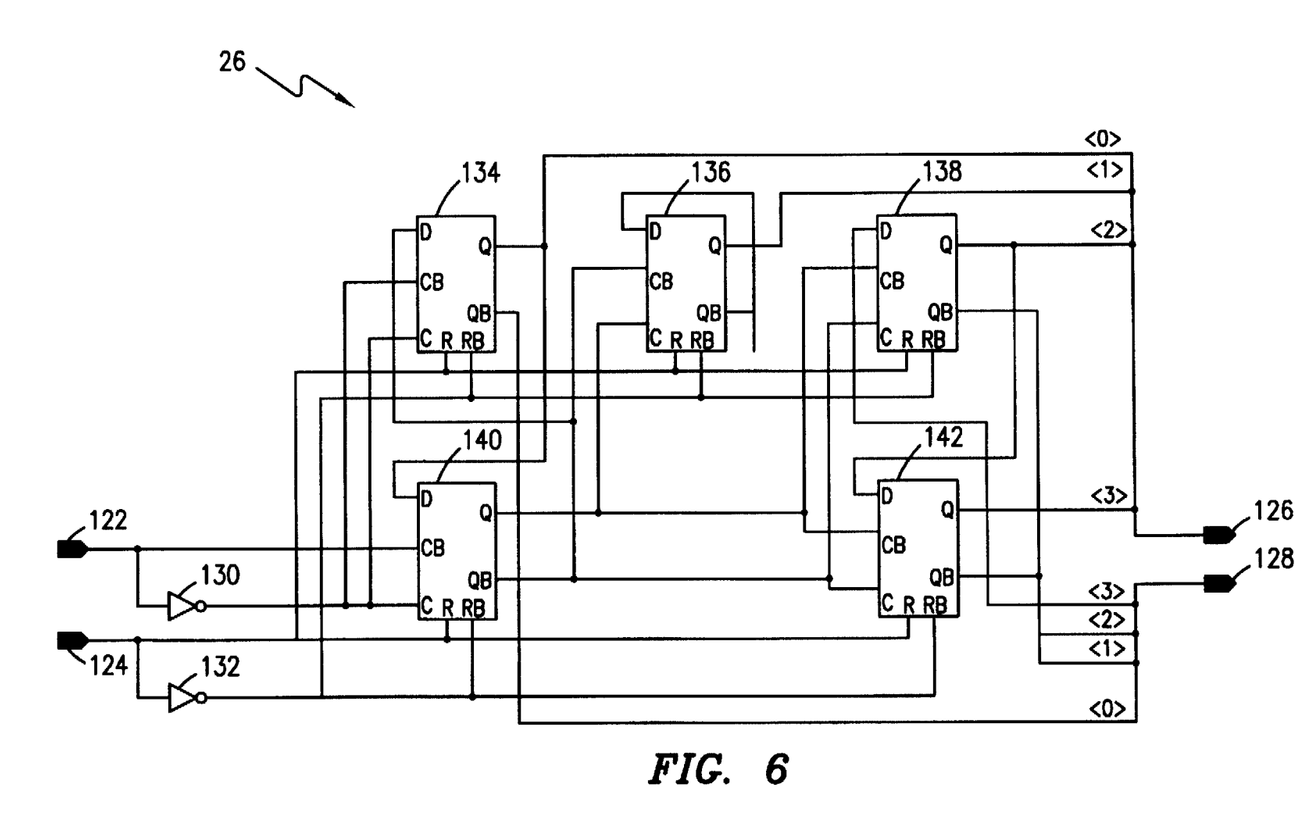
FIG. 6 is a schematic diagram illustrating a counter used in a preferred embodiment of the present invention as similarly shown in FIG. 2.

Referring now to FIG. 6, there is illustrated a preferred embodiment of counter 26 as similarly shown in FIG. 2. Counter 26 includes inputs 122 and 124, outputs 126 and 128, inverters 130 and 132, and gray bits 134, 136, 138, 140 and 142. In this particular embodiment, counter 26 is a gray 16 counter which is a gray coded output counter. The gray coded output counter is a 4 bit counter that counts through 16 states. The outputs 126 and 128 of counter 26 are numbers or values that get sent to inputs 64 and 66, respectively, of state machine 28 (see FIG. 3). State machine 28 decodes the values from counter 26 and at appropriate times will send various signals high, like "sel_ram", "compare", and "init_addr_etc".

Good results have been achieved using counter 26 with state machine 28. However, it is contemplated that other kinds of counters or other methods of synchronizing can be used, depending on a user's particular applications.

Figure 7:
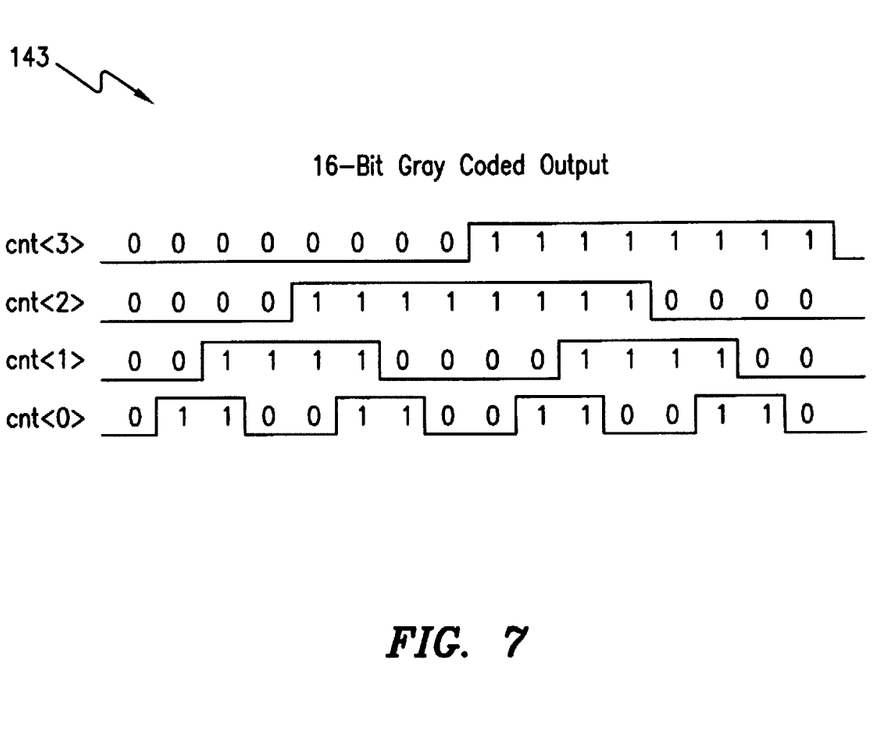
FIG. 7 is a timing diagram illustrating the output of the counter as similarly shown in FIG. 6.

Referring now to FIG. 7, there is illustrated a timing diagram 143 of the output signals at outputs 126 and 128 of counter 26. These signals are received at inputs 64 and 66 of state machine 28.

Figure 8:
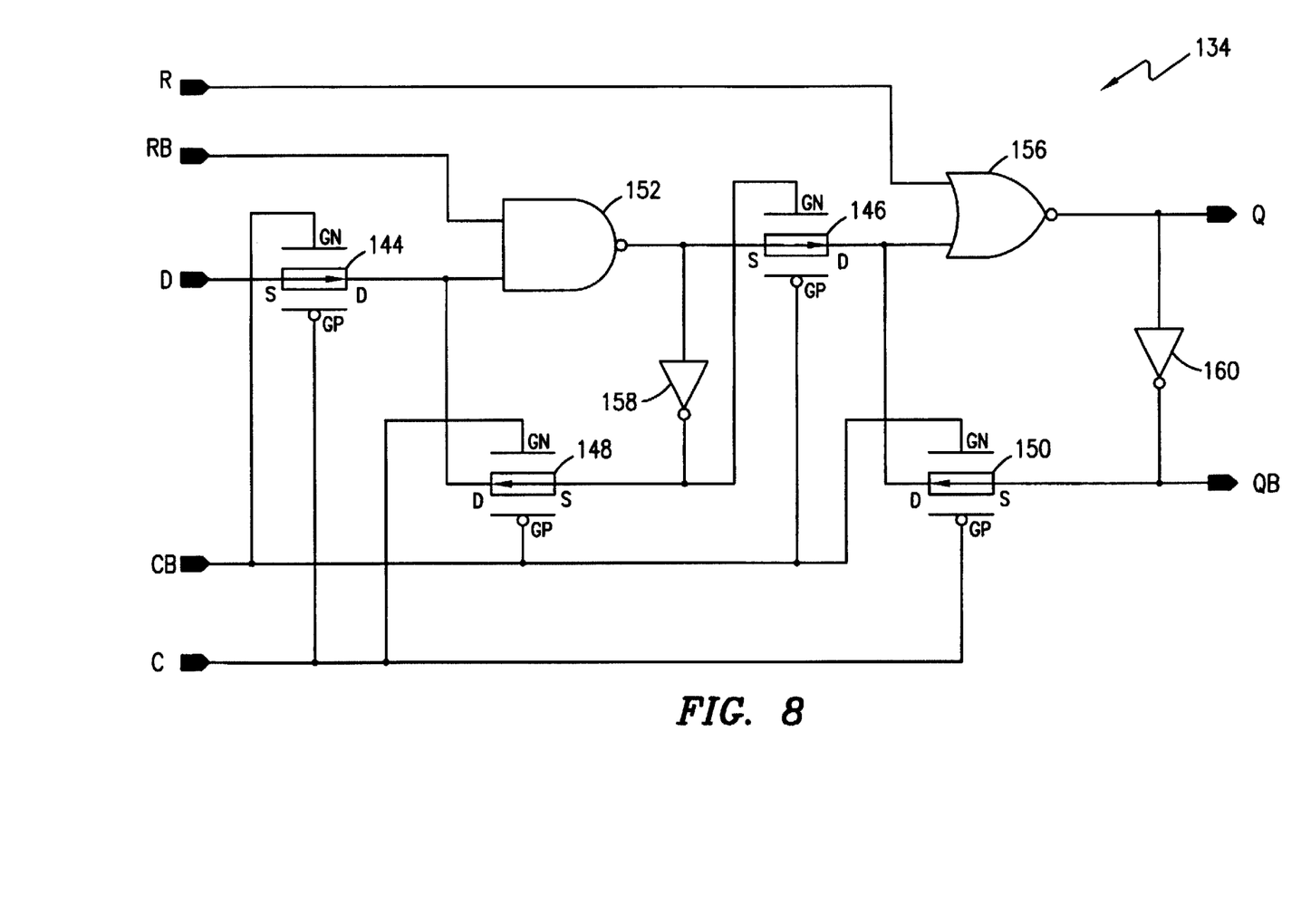
FIG. 8 is a schematic diagram illustrating preferred circuitry utilized by the counter as similarly shown in FIG. 6.

Referring now to FIG. 8, there is shown a schematic diagram of a preferred embodiment of a gray bit 134 as similarly shown in FIG. 6. Gray bit 134 is generally a CMOS flop-flop and includes CMOS transmission gates 144, 146, 148 and 150, NAND gate 152, NOR gate 156, and inverters 158 and 160. Good results have been achieved by using the same configuration as shown in FIG. 8 for each of gray bits 134, 136, 138, 140 and 142. However, it is contemplated that this is not the only configuration which can be utilized in the present invention.

Figure 9:
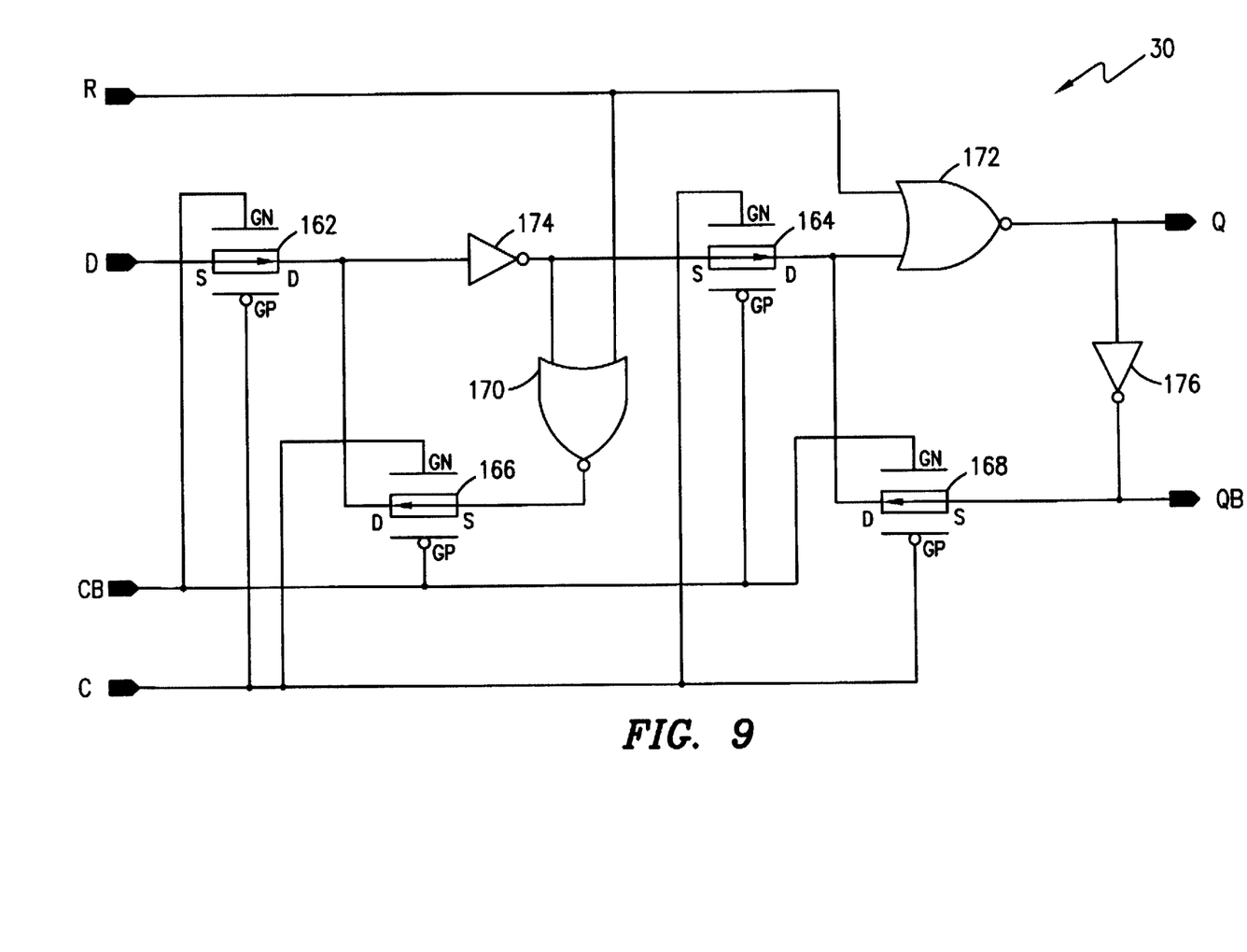
FIG. 9 is a schematic diagram illustrating a preferred latch circuit utilized in a preferred embodiment of the present invention as similarly shown in FIG. 2.

Referring now to FIG. 9, there is shown a schematic diagram of a preferred embodiment of one of the latches 30, as similarly shown in FIG. 2. Good results have been achieved by using the same configuration as shown in FIG. 9 for each of latches 30, 32, 34, and 36. In particular, latch 30 is generally a flop-flop circuit and includes CMOS transmission gates 162, 164, 166 and 168, NOR gates 170 and 172, and inverters 174 and 176.

Referring now to FIGS. 2 and 9, in operation, latches 30 and 32 are used for the increment of the elapsed time counter functions, while latches 34 and 36 are used for the histogram sampling.

When an elapsed time counter increment signal has been accepted, a signal, "etc_latch", will be generated at output Q of latch 32 and will be high. This then clocks latch 32 which will then generate a high "etcbsy" signal at output Q of latch 32, which will stay high for the duration of the processing time. When this is occurring, a high "etcbsy" signal indicates that the elapsed time counter function is incrementing. Once the process is completed then the "rst-state" signal from state machine 28 will go high, causing latch 32 to reset, indicating that the elapsed time counter function is finished incrementing.

Likewise, when a histogram update has been accepted, a signal, "histlatch", will be generated at output Q of latch 34 and will be high. This then clocks latch 36 which will then generate a high "histbsy" signal at output Q of latch 36, which will stay high for the duration of the processing time. When this is occurring, a high "histbsy" signal indicates that the histogram function is operating. Once the process is completed, the "rststate" signal from state machine 28 will go high, causing latch 36 to reset, indicating that the histogram function is finished.

In this particular embodiment, it is important that the counter from state machine 28 be low for all four signals (see FIG. 7) in order for either of the elapsed time counter function or the histogram function to start. If all four signals from the state machine 28 are low, it is indicating that there are no other functions currently operating.

Further, if the "prot_start" signal at input 40 is high (see FIG. 2) the elapsed time counter functions and the histogram functions are prevented from being processed.

CONCLUSION

Although a preferred embodiment of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A device for selectively permitting access to a common resource by a priority device and at least one non-priority device, said device comprising:

a. a priority request reception device for receiving a first request to access the common resource by the priority device;

b. at least one non-priority request reception device for receiving a second request to access the common resource by the at least one non-priority device;

c. a prioritizer coupled to receive indications of times when said priority request reception device receives said first request and to receive indications of times when said at least one non-priority request reception device receives said second request, said prioritizer prioritizing access to the common resource between the priority device and the at least one non-priority device; and d. said prioritizer permitting access to the common resource by the priority device when said priority request reception device receives said first request, and further wherein said prioritizer permitting access to the resource by the at least one non-priority device when said at least one non-priority request reception device receives said second request and subsequent to completion of access to the common resource by the priority device if the priority device had access to the common resource upon reception of the second request.

2. A device as recited in claim 1, wherein:

a. said prioritizer includes a counter device for limiting the duration of said access to the common resource by the non-priority device.

3. A device as recited in claim 2, wherein:

a. said prioritizer includes a state machine controller responsive to said counter device for controlling said access to the common resource by the at least one non-priority device.

4. A device as recited in claim 1, wherein:

a. said priority request reception device is further operative to receive a reset request; and b. said prioritizer includes delay circuitry for delaying access to the common resource by the at least one non-priority device until said priority request reception device receives said reset request.

5. A device as recited in claim 4, wherein:

a. said delay circuitry includes at least one latch.

6. A device as recited in claim 5, wherein:

a. said at least one latch includes flip-flop circuitry.

7. A device as recited in claim 6, wherein:

a. said flip-flop circuitry is a CMOS flip-flop.

8. A device for selectively permitting access to a common resource by a priority device and at least one non-priority device, said device comprising:

a. a first reception means for receiving a first request to access the common resource by the priority device;

b. a second reception means for receiving a second request to access the common resource by the at least one non-priority device;

c. means for prioritizing access to the common resource between the priority device and the at least one non-priority device, said prioritizing means being coupled to said first reception means and said second reception means and being responsive to said first reception means receiving said first request and being responsive to said second reception means receiving said second request; and d. said prioritizing means including circuitry to permit access to the common resource by the priority device when said first reception means receives said first request, and further to permit access to the resource by the at least one non-priority device when said second reception means receives said second request and subsequent to completion of access to the common resource by the priority device if the priority device had access to the common resource upon reception of the second request.

9. A device as recited in claim 8, wherein:

a. said prioritizing means includes a counter device for limiting the duration of said access to the common resource by the non-priority device.

10. A device as recited in claim 9, wherein:

a. said first reception means is further operative to receive a reset request; and b. said prioritizing means includes delay circuitry for delaying access to the common resource by the at least one non-priority device until said first reception means receives said reset request.

11. A device as recited in claim 10, wherein:

a. said delay circuitry includes at least one latch.

12. A device as recited in claim 11, wherein:

a. said at least one latch includes flip-flop circuitry.

13. A device as recited in claim 12, wherein:

a. said flip-flop circuitry is CMOS flip-flop circuitry.

14. A device as recited in claim 13, wherein:

a. said prioritizing means includes a state machine controller responsive to said counter device for controlling said access to the common resource by the at least one non-priority device.

15. A method for selectively permitting access to a common resource by a priority device and at least one non-priority device, comprising the steps of:

a. receiving a first request to access the resource by the priority device;

b. receiving a second request to access the resource by the at least one non-priority device;

c. prioritizing access to the common resource between the priority device and the at least one non-priority device responsive to the received first request and the received second request;

d. permitting access to the common resource by the priority device upon reception of the first request; and e. permitting access to the common resource by the non-priority device upon reception of the second request and subsequent to completing access to the common resource by the priority device if the priority device had access to the common resource upon reception of the second request.

16. A method as recited in claim 15, further including the step of:

a. limiting the duration of the access to the common resource by the non-priority device to a predetermined period of time.

17. A method as recited in claim 16, further including the step of:

a. delaying access to the common resource by the at least one non-priority device until a reset request is received.

* * * * *